United States Patent [19]
Von Walter

[11] 3,875,366
[45] Apr. 1, 1975

[54] METHOD AND APPARATUS FOR REGULATING THE BEAM CURRENT IN INDUSTRIAL CHARGE CARRIER BEAM APPARATUS

[75] Inventor: Alfred Von Walter, Munich, Germany

[73] Assignee: Steigerwald Strahltechnik GmbH, Munich, Germany

[22] Filed: Oct. 25, 1972

[21] Appl. No.: 300,787

[30] Foreign Application Priority Data
Oct. 28, 1971   Germany............................ 2153695

[52] U.S. Cl...... 219/121 EM, 315/158, 219/121 EB
[51] Int. Cl............................................ B23k 15/00
[58] Field of Search... 219/121 R, 121 EB, 121 EM; 315/8.5, 84.5, 105, 158, 199

[56]   References Cited
   UNITED STATES PATENTS
3,092,751   6/1963   Clark .................... 315/8.5
3,196,246   7/1965   El-Kareh................. 219/121 EM X

*Primary Examiner*—J. V. Truhe
*Assistant Examiner*—G. R. Peterson
*Attorney, Agent, or Firm*—Nichol M. Sandoe

[57]   ABSTRACT

A method for regulating the beam current in industrial charge-carrier beam apparatus in which, by direct measurement of a beam of charge carriers produced in pulse form within the region of the beam path, measurement signals, which in each case are dependent essentially on the peak value of the pulse amplitudes, are derived for the subsequent formation of analog control variables serving for the regulation of the beam current, the measurement signals being first stored in each case in accordance with a pulse spacing.

12 Claims, 3 Drawing Figures

FIG.3
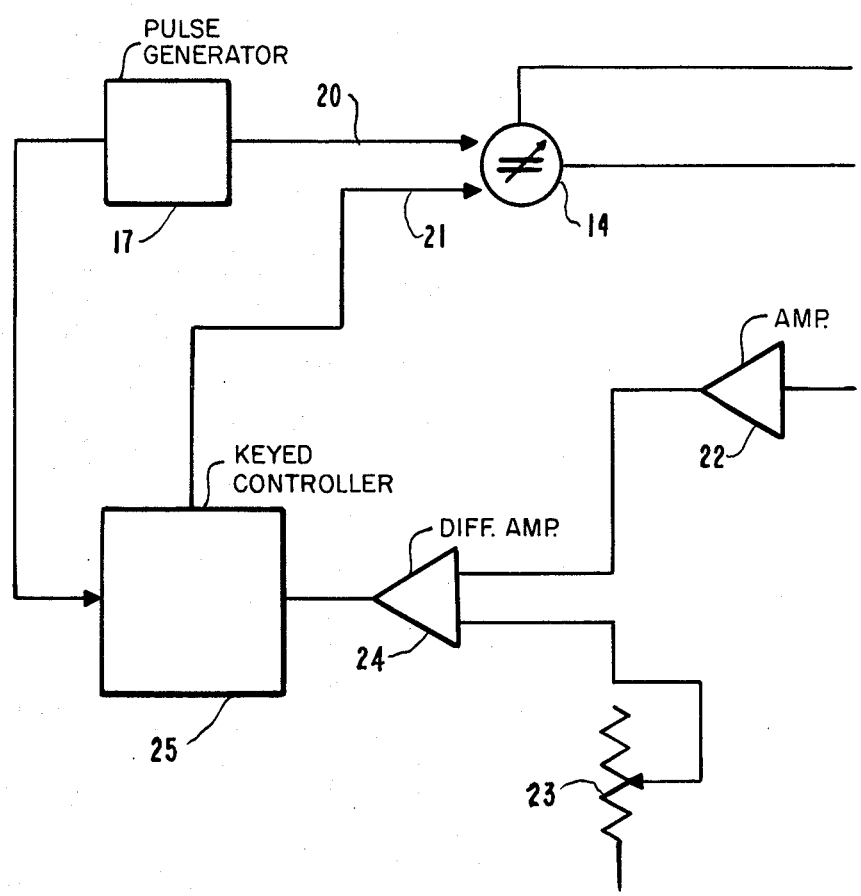
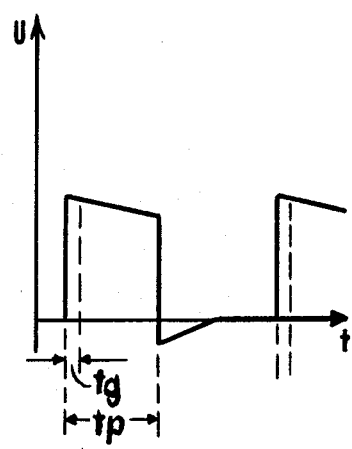
FIG.2

METHOD AND APPARATUS FOR REGULATING THE BEAM CURRENT IN INDUSTRIAL CHARGE CARRIER BEAM APPARATUS

The present invention relates to a method for regulating the beam current in industrial charge-carrier beam apparatus, and particularly electron-beam material machining machines. The invention also relates to an apparatus for carrying out the process.

During the operation of apparatus in which a beam of charge carriers of high accelerating voltage is produced, it is necessary in many cases to adjust the beam current of the charge-carrier beam continuously to a predetermined constant value, i.e., to stabilize it. Such a need exists for example, in an electron-beam generating system for a material machining machine in which the energy of the accelerated electron beam is utilized for the thermal treatment or machining of workpieces or the like, for example for welding, boring, drilling, perforating, hardening, etc., and in which the result of the machining is dependent in quantitative and/or qualitative respects essentially on the constancy of the supplying of energy to the place of working.

The electron-beam generating system consists for this purpose primarily of a thermionic cathode, a control electrode (Wehnelt electrode) and an anode, the cathode and the Wehnelt electrode being at high voltage potential and the anode at ground potential.

For a continuous-beam operation of an apparatus having a beam-generating system of the aforementioned type, it has hitherto been proposed to effect the regulation of the beam current by introducing the voltage drop determined at a resistor located between the base of the high-voltage supply and ground as a measurement signal porportional to the actual value of the beam current into a controlled circuit via which the Wehnelt-electrode D.C. voltage and, thus also the beam current can be adjusted to a predetermined desired value. This method however, has the disadvantage that the type of determination of the actual value provided does not take into consideration the intensity of the beam current actually impinging on the workpiece or the like, since the actual value corresponds exclusively to the beam current present directly in the vicinity of the beam-generating system, and any losses in energy occurring in the further course of the path of the beam and caused, for example, by diaphragm means or the like, are not included in the measurement. In the method of control which has already been proposed, the efficiency of the beam in the region of the place of machining or working is, thus, neglected, so that the beam current finally adjusted may lie below the value actually required.

In addition to this, the previously proposed method of control cannot be used in practice in the case of pulseproduced charge-carrier beams, since it would permit merely a stabilization to an average value of the beam current and this average would furthermore be so small, e.g. in the case of low pulse widths and low pulse frequency, that it would still lie below the noise level of the high-voltage supply of the electron-beam generator, so that an actual-value measurement in the manner described above is no longer possible.

In certain machining problems, it is furthermore necessary for the beam pulses to be triggered as a function of the position of the workpiece relative to the electron beam so that the pulse frequency is not constant. In such cases, there is a variation of the average value of the beam current per unit of time and a regulation of the beam current via the average value can, therefore, not enter into consideration.

An object of the invention, therefore is to provide a new method for regulating or stabilizing the beam current in industrial charge-carrier beam apparatus which does not have the disadvantages of the aforementioned method in that it avoids stabilization merely on an average value of the beam current, particularly in the case of pulse operation of the charge-carrier beam. Even with any other form of pulse of the charge-carrier beam, as for example, in the case of a pulse modulation of the charge-carrier beam, stabilization of the beam current is made possible in optimal fashion.

This object is obtained in accordance with the invention by providing that by direct measurement of a beam of charge carriers produced in pulse form within the region of its beam path, measurement signals, which in each case are dependent essentially on the peak value of the pulse amplitudes, are derived for the subsequent formation of analog control variables serving for the regulation of the beam current, the measurement signals being first stored in each case in accordance with a pulse spacing.

Due to the features characteristic of the invention, a number of advantages are obtained. On the one hand, as a result of the direct measurement provided on the charge-carrier beam pulses in the region of the beam path, there can be assured a determination of the actual value which corresponds to the effective value of the beam current. On the other hand, the measurement signals which, for example, directly represent the actual values of the beam current are also absolutely independent of the specific pulse form of a charge-carrier beam, and particularly of the specific pulse width, since these measurement signals always correspond precisely to the maximum amplitude of a beam pulse. In addition to this, the method of the invention permits adaptation of the control process to the specific pulse duty factor of the beam pulses, since the measurement signals are stored in each case in accordance with the pulse spacing. Every measurement signal derived in accordance with the invention, therefore, is always stored before the formation of the actual analog control variable serving for the regulation of the beam current until the next following measurement signal arrives.

It has already been mentioned that the measurement signals derived in accordance with the process of the invention can be further processed directly as beam-current actual values. The stored measurement signals can, therefore, be fed in each case to a desired actual value comparison with respect to the pulse amplitudes.

The method of the invention, however, also affords the possibility that a desired actual value comparison is effected only after the rolling out of a measurement signal, by direct measurement of the charge-carrier beam pulses, a corresponding pulsating primary signal is produced and is sampled in known manner for the determination of the maximum amplitude of each pulse or for the formation of the "secondary" measurement signal dependent on this maximum amplitude. Since such methods for the sampling of high-frequency signals (sampling technique may be deemed known to the man skilled in the art, a detailed discussion of the sampling process can be dispensed with.

Insofar as a desired actual value comparison is to be provided in the method of the invention before the formation of the measurement signals to be stored, as already mentioned above, it is advisable to produce a corresponding pulsating primary signal by direct measurement of the charge-carrier beam pulses and compare it with a desired value signal in order to form a difference signal. This difference signal is then sampled in known manner to determine the value of the difference signal corresponding to the maximum amplitude of each pulse or to form the "secondary" measurement signal which is dependent on this value.

For the sampling either of the primary signal or of the difference signal, the production of the keying pulses for the specific signal sampling is synchronized with the production of the charge-carrier beam pulses in accordance with a further development of the invention. In this connection, it may furthermore be advisable if the pulse width $t_g$ of each keying pulse is adjusted with respect to the pulse width $t_p$ of a charge-carrier beam pulse in accordance with the following relationship:

$t_g = t_g$ (max), when $t_p > t_g$ (max)

or $t_g = t_p$ when $t_p > t_g$ (max) where $t_g$ (max) is a nominal keying pulse width.

The adjustment of the pulse widths of the keying pulses preferably takes place automatically. In this way, there is taken into account the possibility that in the case of certain pulse forms, the pulse width $t_p$ of the chargecarrier beam may be shorter than the maximum scanning pulse width $t_g$ (max) and therefore a keying pulse of smaller width is necessary, preferably with a pulse width which is equal to that of the charge-carrier beam pulse. In general, however, the width of the charge-carrier beam pulses becomes greater than the maximum keying pulse width, so that this given keying pulse $t_g$ (max) can be used, which pulse furthermore is determined as a function of the permissible measurement error of the selected system for the direct measurement of the charge-carrier beam.

For the carrying out of the process of the invention there can preferably be used an apparatus which has a keyed controller arranged in the control circuit and which contains a signal sampling circuit with instantaneous-value storage for producing and storing the measurement signals which are dependent only on the peak value of the pulse amplitudes and which can be controlled by keying pulses supplied by a pulse generator for the charge-carrier beam generating system. This keyed controller, in the event that the measurement signals which have been referred to above as "secondary" measurement signals are to be fed after the expiration of the storage time to a desired actual value comparison with respect to the pulse amplitudes, can have separate inputs, namely a first input for a direct desired-value admission and a second input for a direct introduction of the pulsating primary signals formed by measurement of the charge-carrier beam.

When the desired value/actual value comparison with respect to the pulse amplitudes of the beam current is to be effected before the formation of the "secondary" measurement signals which are to be stored, then, instead of the aforementioned circuit arrangement, there can be connected in front of the keyed controller a difference amplifier for a desired value/actual value comparison, in which case the difference amplifier must have one input for the introduction of the desired value and one input for the introduction of the pulsating primary signals formed by measurement of the charge-carrier beam.

The drawings serve further to explain the invention and its further developments. Within the scope of embodiments:

FIG. 2 is a corresponding pulse diagram, and

FIG. 3 is a block diagram of another apparatus suitable for beam-current stabilization.

Figure 1:
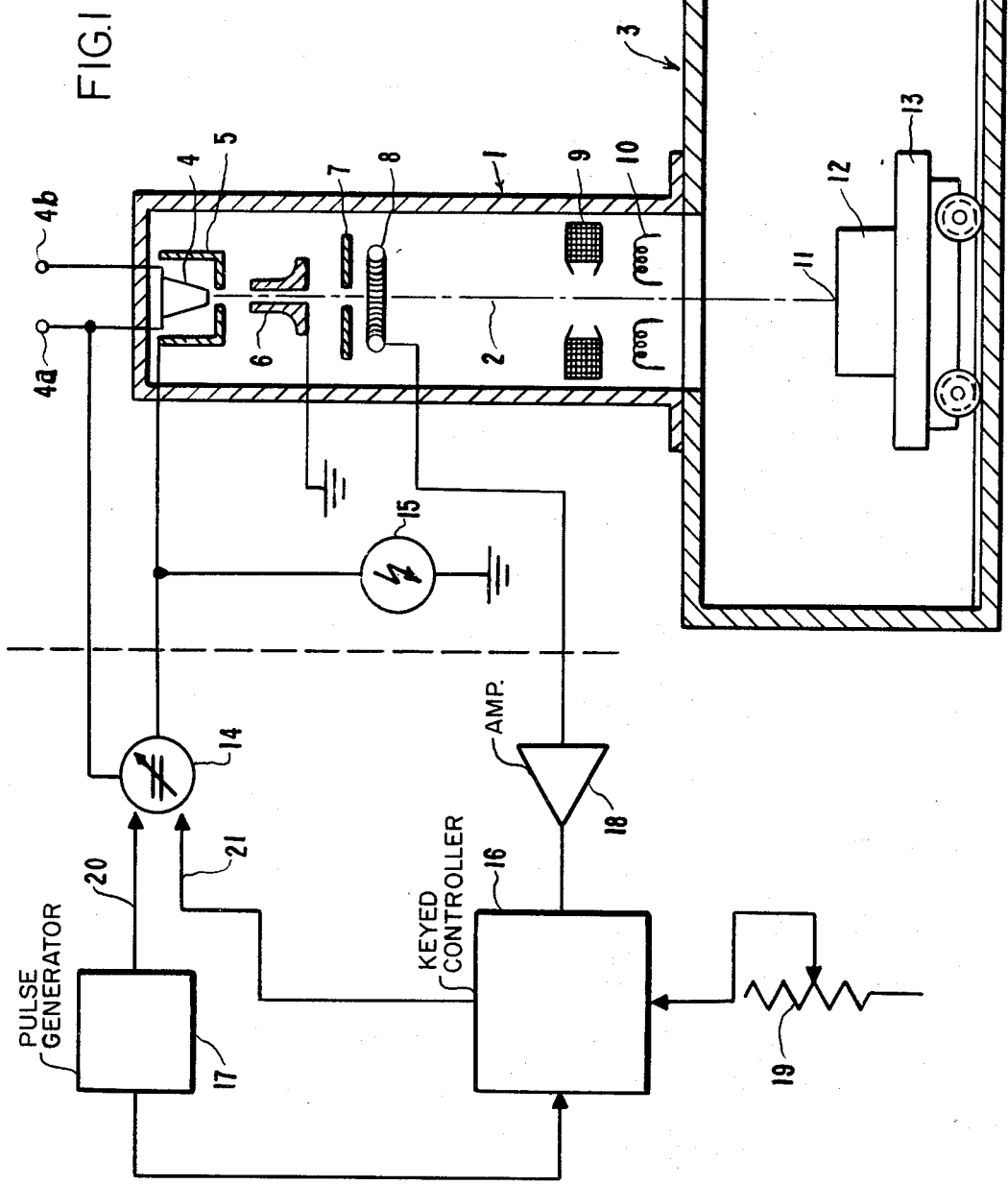
FIG. 1 shows a block diagram of an apparatus in accordance with the invention serving for the stabilizing of the beam current of an electron-beam material machining machine.

An electron-beam material machining machine such as shown schematically in FIG. 1 consists primarily of an electronbeam generator 1 and a working chamber 3 in which a workpiece 12 which is to be machined is arranged. Both the housing of the electron-beam generator 1 and the work chamber 3 can be evacuated by vacuum-pump means (not shown) in order to be able to maintain continuously the high vacuum of approximately the order of magnitude of $10^{-4}$ mm Mg necessary for the thermal machining of the workpiece 12 by means of the electron beam 2.

In the upper part of the housing of the electronbeam generator 1 there is arranged the actual beam-generating system. It consists essentially of a thermionic cathode 4, a Wehnelt cylinder 5 and a grounded anode 6. The cathode 4 receives its heating voltage via terminals 4a and 4b, the cathode 4 being simultaneously connected with a high-voltage supply 15, and thus lying at negative high-voltage potential. In front of the Wehnelt cylinder 5, which also lies at negative high-voltage potential, there is connected a setting member 14 for regulating the Wehnelt direct voltage. This setting member 14 is acted on via a digital channel 20 by the control pulses of a pulse generator 17, so that a pulsating electron beam 2 is produced which thereupon in the accelerating field between the Wehnelt cylinder 5 and the anode 6 experiences a high acceleration and emerges from the actual beam-generating system through a central bore in the anode 6.

Below the anode 6, there is provided a diaphragm 7 which is directly followed by a toroidal coil 8 for the determination of the actual value of the beam current. The housing of the electron-beam generator furthermore contains an electromagnetic lens 9 for focusing the beam pulses at a focal point 11 located on the surface of the workpiece 12. Furthermore, below the lens 9, there are also arranged deflection coils 10 which serve for the deflection of the beam. The workpiece 12 located in the working chamber 3 lies on a transportation device 13 by means of which the workpiece 12 can be moved relative to the machining electron beam if, for example, in certain machining problems, such workpiece movements are necessary during the machining.

The stabilizing of the beam current of the electron beam produced in pulse form is now effected in detail as follows with the use of the method of the invention.

First of all, by utilization of the time changes of the magnetic induction flow occurring in the immediate vicinity of the electron-beam pulses, there is produced by the toroidal coil 8 a corresponding electric voltage the course of which can be noted from the pulse diagram of FIG. 2 and which serves as primary signal for the following control device. This pulse-like primary signal is then amplified by an amplifier 18 arranged behind the toroidal coil 8 and fed to a keyed controller 16 by means of which secondary measurement signals depending only on the peak value of the corresponding pulse amplitudes can be produced. For this purpose, the controller 16 contains a signal sampling circuit which obtains its keying pulses from the pulse generator 17, and an instantaneous-value storage for storing the secondary measurement signals in each case in accordance with the pulse spacing of the electron-beam pulses.

Since the keying pulses ($t_g$, FIG. 2) have the same frequency as the control pulses for the Wehnelt cylinder 5 and furthermore are so dimensioned by means of a time member contained in the controller 16 with respect to the maximum pulse widths $t_h$ (max) that this pulse width is substantially shorter than the pulse width $t_p$ of the electron-beam pulses or of the primary signal produced by means of the toroidal coil 8 in accordance with FIG. 2, each keying pulse arrives at a time when each pulse of the primary signal has its maximum amplitude. Therefore, in this connection, at all times only the voltage in the region of the front flank of each pulse of the train of pulses representing the primary signal is measured and thereby a secondary measurement signal is formed which is dependent solely on the maximum pulse amplitudes, and, thus, corresponds to the true actual value of the beam current. By such a pulse-time limitation of the keying pulses, there can furthermore also be excluded a measurement error caused by the limited band width of the measurement system used for the beam-current measurement, particularly if — differing from the embodiment in accordance with FIG. 2 — electron-beam pulses of any desired pulse forms are produced.

The keyed controller 16 furthermore has separate inputs for a direct feeding of the beam-current desired value by means of a potentiometer 19 on the one hand and for the introduction of the primary signals on the other hand.

The secondary measurement signals stored for a short time by the instantaneous-value storage of the controller 16 are fed, after the end of the storage time which is equal to the pulse spacing of the electron-beam pulses, to a desired value-actual value comparison in the controller 16. In this way, the analog control magnitude necessary for the adjustment or stabilization of the beam current can be formed, with which thereupon the setting member 14 arranged in the control circuit behind the keyed controller 16 is acted on via the analog channel 21 so that a corresponding regulation of the D.C. voltage of the Wehnelt cylinder 5 can take place, and, thus, the beam current of the electron beam pulses can be stabilized to the desired value.

FIG. 3 furthermore shows within the scope of an example a variant circuit of a device serving for the stabilization of the beam current in electron-beam material machining machines which is suitable when the desired value/actual value comparison with respect to the pulse amplitudes of the beam current is to be carried out even before the formation of the secondary measurement signal. In this case, the circuit arrangement in accordance with FIG. 1, left of the dashed line contained in FIG. 1, can be replaced by the circuit arrangement of FIG. 3. The latter differs from the control device shown in FIG. 1 essentially by the fact that a difference amplifier 24 for the desired value/actual value comparison is connected in front of a keyed controller 25 which now contains no means for the desired value/actual value comparison. This difference amplifier 24 has in each case one input for the desired-value admission by means of a potentiometer 23 and for the introduction of a pulsating primary signal which in its turn can be obtained in the manner desired in FIG. 1. Accordingly, in front of the difference amplifier 24, there is connected a preamplifier 22 which in its turn is coupled with the toroidal coil 8 in accordance with FIG. 1 which surrounds the electron beam and is centered on its axis 2, which preamplifier thus amplifies the voltage pulses induced in the toroidal coil 8. In order to form a difference signal, the pulsating primary signal is compared in the difference amplifier 24 with the desired value and this difference signal is then offered to the keyed controller 25 in which it is sampled to determine the value of the difference signal corresponding to the maximum amplitude of each pulse of the primary signal or to form the secondary measurement signal depending on this value by means of a signal sampling circuit. The controller 25 can be controlled in this connection also in accordance with the circuit arrangement of FIG. 1 by keying pulses supplied by the pulse generator 17 and with same there can again be produced secondary measurement signals which are dependent only on the peak value of the pulse amplitudes of the electron beam pulses. After the intermediate storage of the secondary measurement signals in the instantaneous-value storage of the controller 25, the beam-current stabilization can then take place in the manner described above by the feeding to the setting member 14 of analog control variables via the channel 21 of the control circuit, while at the same time the control pulses of the pulse generator 17 are fed via the digital channel 20 to the setting member 14.

Within the scope of the embodiments described above, there was taken into account in particular the possibility of the pulse width $t_p$ of the electron-beam pulses being greater than the pulse width $t_g$ (max) of the keying pulses for the controller 16 and 25 respectively, so that each keying pulse can have the width $t_g$ (max). However, on the other hand, it is also possible to conceive of cases of use in which the pulse width $t_p$ of the electron-beam pulses is shorter than $t_g$ (max). In such cases, the effective pulse width $t_g$ of the keying pulses can automatically be so adjusted that it is equal to the pulse width $t_p$ of the electron-beam pulses.

The method of the invention for the stabilizing of the beam current can advantageously be employed in charge-carrier beam apparatus in which pulse operation is intended from the start. However, it is also suitable in those cases in which the apparatus in itself is to operate in continuous beam operation, but the possibility exists of turning off the beam periodically for such a short time that no noticeable reduction in intensity as compared with actual continuous beam operation occurs. Thus, for example, in the case of an electron-beam welding machine operating with continuous beam, a sort of pulse beam could be produced by turning off the electron beam with a frequency of 100 cycles per second for a period of about 10 $\mu$ s. As a result of this measure, there would result a reduction in intensity of 1 per mil which can easily be tolerated since, for example, with a welding speed of 100 mm/sec., a workpiece has just moved over a path of 1 $\mu$ m in 10 $\mu$ s.

What is claimed is:

1. A method for regulating the beam current in pulsed charge-carrier beam apparatus, characterized by the steps of directly inductively measuring the amplitude of the pulsed charge-carrier beam about the path of propagation of said pulsating beam, providing a signal indicative of said beam amplitude, determining the peak value of each beam pulse by determining the peak value of the signal representative thereof, supplying a signal representative of the desired peak pulse amplitude, and controlling said beam pulse amplitude, said beam pulse amplitude controlling step comprising the steps of comparing the signals representative of said peak pulse amplitude and said desired amplitude signal to generate a difference signal, and varying said pulsed beam current amplitude dependent upon said difference signal, said pulse amplitude controlling step further comprising the step of storing control information in the interval between consecutive beam pulses.

2. A method as in claim 1 wherein said controlling step comprises the steps of storing a signal indicative of the peak value of the last processed beam pulse, and comparing the stored pulse amplitude signal with the signal representative of the desired peak amplitude to generate the difference signal.

3. A method as in claim 1 wherein said controlling step further comprises the step of sampling and storing said difference signal, and varying said pulsed beam current dependent upon said sampled and stored difference signal.

4. A method as in claim 1 where said peak value determining step comprises sampling the beam pulse amplitude indicative signal at the initial portion of each said measured beam pulse.

5. A method as in claim 4 further comprising the steps of providing a keying pulse for signal sampling coincidentally with the provision of a charge-carrier beam pulse.

6. A method as in claim 5, characterized by the pulse width of the keying pulses $t_g$ being adjusted with respect to the pulse width of a charge-carrier beam pulse $t_p$ such that $t_g = t_g(\max)$, when $t_p > t_g(\max)$ and $t_g = t_p$ when $t_p < t_g(\max)$, where $t_g(\max)$ is a nominal keying pulse width.

7. In combination in apparatus for regulating the beam current in pulsed charge-carrier beam apparatus, means for supplying a pulsed electron beam, controlled beam current pulse amplitude varying apparatus for varying said electron pulses in accordance with a control signal supplied thereto, means for directly inductively measuring the amplitude of the charge-carrier beam about the path of propagation of said pulsating beam, said measuring means including means for providing a signal indicative of said beam amplitude, means for determining the peak amplitude of each measured beam pulse responsive to the signal representative of each such pulse, means for providing a reference signal for establishing a desired pulse amplitude value, and sample and hold and difference determining means responsive to the difference between the peak value of a measured current pulse and said reference signal supplied by said source thereof for supplying a beam pulse amplitude controlling signal to said controlled beam current pulse amplitude varying means.

8. A combination as in claim 7 wherein said sample and hold and difference determining means comprises sample and hold means for preserving the peak value of each pulse generated by said pulse measuring means, and difference amplifier means operating upon the output of said sample and hold means and the output of said desired value reference source.

9. A combination as in claim 7 wherein said sample and hold and difference determining means comprises difference amplifier means responsive to the outputs of said measuring means and said desired value source means, and sample and hold means responsive to the output of said difference amplifier means for controlling said controlled beam current pulse amplitude varying means.

10. A combination as in claim 8 further comprising pulse supplying means for causing said controlled beam current apparatus to generate beam current pulses, and means responsive to each said pulse supplied by said pulse generating means for supplying a control pulse to said sample and hold means causing said sample and hold means to operate in a sample mode.

11. A combination as in claim 9 further comprising pulse supplying means for causing said controlled beam current apparatus to generate beam current pulses, and means responsive to each said pulse supplied by said pulse generating means for supplying a control pulse to said sample and hold means causing said sample and hold means to operate in a sample mode.

12. A combination as in claim 7 wherein said measuring means comprises coil means disposed about the beam propagating path for inductive coupling to said beam.

* * * * *